(12) United States Patent
Iwata et al.

(10) Patent No.: US 8,353,983 B2
(45) Date of Patent: Jan. 15, 2013

(54) SHRINKAGE REDUCING AGENT

(75) Inventors: Raita Iwata, Chigasaki (JP); Tomomi Sugiyama, Chigasaki (JP); Takumi Sugamata, Chigasaki (JP)

(73) Assignee: Construction Research & Technology GmbH, Trostberg (DE)

( * ) Notice: Subject to any disclaimer, the term of this patent is extended or adjusted under 35 U.S.C. 154(b) by 210 days.

(21) Appl. No.: 12/812,854

(22) PCT Filed: Dec. 8, 2008
(Under 37 CFR 1.47)

(86) PCT No.: PCT/EP2008/067001
§ 371 (c)(1),
(2), (4) Date: Oct. 12, 2010

(87) PCT Pub. No.: WO2009/095131
PCT Pub. Date: Aug. 6, 2009

(65) Prior Publication Data
US 2012/0125236 A1    May 24, 2012
US 2012/0266782 A9    Oct. 25, 2012

(30) Foreign Application Priority Data
Jan. 28, 2008  (JP) ................. 2008-016559

(51) Int. Cl.
*C04B 24/00*  (2006.01)
(52) U.S. Cl. ........ 106/724; 106/725; 106/727; 106/728; 524/2
(58) Field of Classification Search .............. 106/724, 106/730, 725, 727, 728; 524/2
See application file for complete search history.

(56) References Cited

U.S. PATENT DOCUMENTS

| | | | |
|---|---|---|---|
| 4,471,100 A | 9/1984 | Tsubakimoto et al. | |
| 4,547,223 A * | 10/1985 | Goto et al. | 106/802 |
| 5,326,396 A | 7/1994 | Abdelrazig et al. | |
| 5,326,397 A | 7/1994 | Abdelrazig et al. | |
| 5,389,143 A | 2/1995 | Abdelrazig et al. | |
| 5,413,634 A * | 5/1995 | Shawl et al. | 106/696 |
| 5,556,460 A | 9/1996 | Berke et al. | |
| 5,571,319 A | 11/1996 | Berke et al. | |
| 5,603,760 A | 2/1997 | Berke et al. | |
| 5,604,273 A | 2/1997 | Kerkar et al. | |
| 5,618,344 A | 4/1997 | Kerkar et al. | |
| 5,622,558 A | 4/1997 | Berke et al. | |
| 5,626,663 A | 5/1997 | Berke et al. | |
| 5,641,352 A | 6/1997 | Jeknavorian et al. | |
| 5,660,626 A | 8/1997 | Ohta et al. | |
| 5,679,150 A | 10/1997 | Kerkar et al. | |
| 5,779,788 A | 7/1998 | Berke et al. | |
| 5,782,972 A | 7/1998 | Abelleira et al. | |
| 5,854,318 A | 12/1998 | Tahara et al. | |
| 5,912,284 A | 6/1999 | Hirata et al. | |
| 5,938,835 A * | 8/1999 | Shawl et al. | 106/724 |
| 6,251,180 B1 | 6/2001 | Engstrand et al. | |
| 6,277,191 B1 | 8/2001 | Budiansky et al. | |
| 6,384,141 B2 | 5/2002 | Hirata et al. | |
| 6,398,866 B1 | 6/2002 | Wombacher et al. | |
| 6,436,184 B1 | 8/2002 | Ceccaldi et al. | |
| 6,441,054 B1 | 8/2002 | Ou et al. | |
| 6,454,849 B1 | 9/2002 | Kinoshita et al. | |
| 6,454,850 B2 | 9/2002 | Yamashita et al. | |
| 6,506,945 B2 | 1/2003 | Kluesener et al. | |
| 6,630,020 B2 * | 10/2003 | Shimoyama et al. | 106/724 |
| 6,686,330 B2 | 2/2004 | Jordan, IV et al. | |
| 6,712,900 B2 | 3/2004 | Wombacher et al. | |
| 6,849,118 B2 | 2/2005 | Kerkar et al. | |
| 6,898,917 B2 | 5/2005 | Durning et al. | |
| 6,911,494 B2 | 6/2005 | Yamashita et al. | |
| 6,919,388 B2 | 7/2005 | Nishikawa et al. | |
| 6,939,402 B2 | 9/2005 | Choi et al. | |
| 7,125,944 B2 | 10/2006 | Yamashita et al. | |
| 7,219,479 B2 | 5/2007 | Durning et al. | |
| 7,253,220 B2 | 8/2007 | Yamashita et al. | |
| 7,259,197 B2 | 8/2007 | Mitsui et al. | |
| 7,304,104 B2 | 12/2007 | Yamashita et al. | |
| 7,601,770 B2 | 10/2009 | Inoue et al. | |
| 2002/0117086 A1 | 8/2002 | Shi et al. | |
| 2003/0136307 A1 | 7/2003 | Ou et al. | |
| 2006/0201393 A1 | 9/2006 | Rice et al. | |
| 2007/0073022 A1 | 3/2007 | Yuasa et al. | |

(Continued)

FOREIGN PATENT DOCUMENTS

EP    0 643 022 A    3/1995

(Continued)

OTHER PUBLICATIONS

Kasai, Yoshio, et al.; "New—cement/concrete admixture"; Gizyutsu Shoin; Jan. 15, 2007; pp. 200-204.

(Continued)

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

To provide shrinkage reducing agents which render excellent shrinkage reducing effect and frost-thaw resistance to cement compositions such as mortar and concrete without entraining excessive air, and exhibit excellent solution stability.

The shrinkage reducing agent comprises a (poly)alkylene compound having an unsaturated bond represented by the formula (1):

$$R^2O\text{---}R^1\text{---}O\text{-}(A^1O)_n\text{---}R^3 \qquad (1)$$

$$\text{-}(A^2O)_m\text{---}R^4 \qquad (2)$$

(wherein $R^1$ is a $C_{2\text{-}10}$ hydrocarbon group having an unsaturated bond; $R^2$ is hydrogen or the formula (2); $R^3$ and $R^4$ are each independently hydrogen or a $C_{1\text{-}8}$ alkyl group; $A^1O$ and $A^2O$ are one or more kinds of $C_{2\text{-}4}$ oxyalkylene groups; and n and m are mean addition numbers of moles of $A^1O$ and $A^2O$, respectively, and 1 to 20).

15 Claims, No Drawings

U.S. PATENT DOCUMENTS

| | | |
|---|---|---|
| 2007/0132150 A1 | 6/2007 | Rice et al. |
| 2007/0144406 A1 | 6/2007 | Zampini |
| 2007/0181039 A1 | 8/2007 | Yamamoto et al. |
| 2008/0087199 A1 | 4/2008 | Gartner |
| 2008/0287569 A1 | 11/2008 | Yaguchi et al. |
| 2009/0305019 A1* | 12/2009 | Chanvillard et al. ......... 428/220 |
| 2010/0016476 A1 | 1/2010 | Yaguchi et al. |
| 2010/0130793 A1 | 5/2010 | Yuasa et al. |
| 2011/0297049 A1* | 12/2011 | Zapf et al. .................... 106/803 |
| 2012/0097075 A1* | 4/2012 | Nawa et al. ................... 106/724 |

FOREIGN PATENT DOCUMENTS

| | | |
|---|---|---|
| JP | 57-118058 | 7/1982 |
| JP | 59-13155 A | 7/1984 |
| JP | 59-131552 | 7/1984 |
| JP | 06-279081 A | 10/1994 |
| JP | 8-012396 | 1/1996 |
| JP | 2001 294 466 A | 10/2001 |
| JP | 2001-302307 A | 10/2001 |
| JP | 2002-012461 A | 1/2002 |
| JP | 2002-226246 A | 8/2002 |
| JP | 2002 338315 A | 11/2002 |
| JP | 2003 171 155 A | 6/2003 |
| JP | 2007-076970 A | 3/2007 |
| JP | 2007-153641 A | 6/2007 |
| WO | WO 97-11132 A | 3/1997 |
| WO | WO 98/06678 A | 2/1998 |

OTHER PUBLICATIONS

Translation of the Decision OF Refusal of Japanese Patent Application No. 2008-016559.

PCT/EP2008/067001—Written Opinion of the International Searching Authority, Aug. 6, 2009.

PCT/EP2008/067001—International Search Report, Aug. 6, 2009.

* cited by examiner

SHRINKAGE REDUCING AGENT

CROSS REFERENCE TO RELATED APPLICATIONS

This application is a national stage application of International Application No. PCT/EP2008/067001, filed 8 Dec. 2008 which claims priority from Japanese Patent Application Serial No. 2008-016559, filed 28 Jan. 2008, from which applications priority is claimed, and which are incorporated herein by reference.

The present invention relates to shrinkage reducing agents. More closely, the present invention relates to shrinkage reducing agents which render to cement compositions excellent shrinkage reducing effect and frost-thaw resistance without entraining excessive air, and exhibit excellent solution stability.

Many compounds for improving the shrinkage reducing properties and fluidity of cement compositions such as mortar and concrete have been proposed. For example, a shrinkage reducing agent composed mainly of $C_{1-4}$ alcohol alkylene oxide adduct or $C_{1-4}$ alkylphenol alkylene oxide adduct is generally used with an antifoaming agent since it has a disadvantage of entraining excessive air into cement compositions; it involves problems of difficulty in air volume control and reduction in frost-thaw resistance of cement compositions.

In contrast, various kinds of polycarboxylic acid-based cement dispersants for improving the fluidity of cement compositions have been proposed. Polycarboxylic acid-based cement dispersants, which improve the fluidity of cement compositions by their high water-reducing properties, are generally used with an antifoaming agent since they involve a disadvantage of entraining a large volume of air and increasing air volume contained in cement compositions with time; they involve problems of difficulties in air volume control and reduction in frost-thaw resistance of cement compositions.

In addition, the above shrinkage reducing agent and cement dispersants involve also a problem of poor solution stability since antifoaming agents generally have poor compatibility with a water solution of polycarboxylic acid-based cement dispersant, and are easily separated when used in the form of one solution consisting of the mixture thereof.

Responding to the above problems, Reference 1 proposes a shrinkage reducing agent for cement wherein polyalkylene compounds having a $C_{1-9}$ hydrocarbon group, for example, an alkyl-, alkenyl-, aryl- or cycloalkyl group are impregnated into cement hardened products. Reference 2 proposes a dry-shrinkage reducing agent for cement containing a polyalkylene compound having a $C_{1-8}$ alkyl group or $C_{1-8}$ alkenyl group. References 3 and 4 propose dry shrinkage reducing agents for cement containing acetylene alcohol compounds having a $C_{1-8}$ alkyl group. Reference 5 proposes a cement additive obtained by mixing, in a specific ratio, a polyalkylene compound having a $C_{1-4}$ alkyl group and a water-soluble polymer obtained by polymerizing an oxyalkylene group-containing unsaturated-ester or ether with an unsaturated carboxylic acid, which exhibits excellent self-shrinkage reducing effect even in a low water to powder ratio.

Reference 6 proposes a cement additive composed essentially of a polycarboxylic acid-based copolymer containing a polyalkyleneimine-based monomer as an essential constituting unit, and a polyalkylene-based ether compound having a $C_{1-8}$ alkyl group, which exhibits good self-shrinkage reducing effect in the ultra high strength range and excels in making low viscosity concrete. Reference 7 proposes an admixture which is an admixture composition for hydraulic materials, containing a polyalkylene-based shrinkage reducing agent having a $C_{2-30}$ hydrocarbon group (e.g., alkyl group and cyclic alkyl group) and a polycarboxylic acid-based high performance AE water reducing admixture, which can effectively reduce dry-shrinkage and render fluidity and dispersibility. Reference 8 proposes a cement admixture containing polyalkyleneglycol and a polyalkyleneglycol mono(meth)acrylate/unsaturated carboxylic acid-based copolymer, which can exhibit excellent crack preventing effect by the addition in a small amount and has good fluidity.

Though disclosing the use of polyalkylene compounds as shrinkage reducing agents, the use of acetylene alcohol compounds as shrinkage reducing agents and arts for improving fluidity and shrinkage reducing properties of cement compositions by the use of polyalkylene compounds with polycarboxylic acid compounds, the above References 1 to 8 disclose no art addressing the improvement of frost-thaw resistance of hardened cement compositions and solution stability of cement additives.

Regarding the arts addressing the improvement of shrinkage reducing properties and frost-thaw resistance of hardened cement compositions, Reference 9 proposes an admixture containing a polyalkylene-based shrinkage reducing agent having a $C_{1-10}$ alkyl-, $C_{1-10}$ cycloalkyl-, $C_{1-10}$ alkylphenyl-, $C_{1-10}$ cycloalkylalkyl- or $C_{1-10}$ alkenyl group, an anti-foaming agent and a polycarboxylic acid-based water reducing admixture, which exhibits excellent shrinkage reducing effect and frost damage resistance. Reference 10 proposes an additive for hydraulic cement compositions, obtained by mixing an allyl- or methallyl group-containing polyalkylene compound, a $C_{1-6}$ alkyl- or $C_{4-6}$ cycloalkyl group-containing polyalkylene compound and aliphatic diol diester or aliphatic dicarboxylic acid diester in a specific ratio, which reduces dry-shrinkage and renders resistance against frost-thaw action. The arts disclosed in References 9 and 10 use an anti-foaming agent as an essential component, exhibiting insufficient frost-thaw resistance and solution stability.

As stated above, cement additives which can solve all the problems above were not proposed in prior arts.

[Reference 1] JP Patent Application Laid-Open No. 2002-226246
[Reference 2] JP Patent Application Laid-Open No. 2003-171155
[Reference 3] JP Patent Application Laid-Open No. 59-131552
[Reference 4] JP Patent Application Laid-Open No. 6-279081
[Reference 5] JP Patent Application Laid-Open No. 2001-302307
[Reference 6] JP Patent Application Laid-Open No. 2007-153641
[Reference 7] JP Patent Application Laid-Open No. 2007-76970
[Reference 8] JP Patent Application Laid-Open No. 2002-12461
[Reference 9] JP Patent Application Laid-Open No. 2001-294466
[Reference 10] JP Patent Application Laid-Open No. 2002-338315

The problem to be solved by the present invention is to provide shrinkage reducing agents which render excellent shrinkage reducing effect and frost-thaw resistance to cement compositions without entraining excessive air, and exhibit excellent solution stability.

As a result of close examinations for solving the above problem, the present inventors have found that a (poly)alkylene compound having an unsaturated bond (SR) can solve the above problem perfectly, and accomplished the present invention.

The present invention relates to a shrinkage reducing agent comprising a (poly)alkylene compound having an unsaturated bond represented by the formula (1):

$$R^2O-R^1-O-(A^1O)_n-R^3 \quad (1)$$

$$-(A^2O)_m-R^4 \quad (2)$$

(wherein $R^1$ is a $C_{2-10}$ hydrocarbon group having an unsaturated bond; $R^2$ is hydrogen or the formula (2); $R^3$ and $R^4$ are each independently hydrogen or a $C_{1-8}$ alkyl group; $A^1O$ and $A^2O$ are one or more kinds of $C_{2-4}$ oxyalkylene groups; and n and m are mean addition numbers of moles of $A^1O$ and $A^2O$, respectively, and 1 to 20).

The present invention relates to the shrinkage reducing agent, wherein the unsaturated bond of $R^1$ in the formula (1) is a triple bond.

The present invention relates to the shrinkage reducing agent, wherein $R^1$ in the formula (1) is a butyne group.

The present invention relates to the shrinkage reducing agent, comprising additional one or more kinds of shrinkage reducing agents (B) represented by the formula (3):

$$Q^1-O-(B^1O)_r-Q^2 \quad (3)$$

(wherein $Q^1$ is a $C_{1-9}$ alkyl group or alkenyl group; $Q^2$ is hydrogen or a $C_{1-8}$ alkyl group; $B^1O$ is one or more kinds of $C_{2-4}$ oxyalkylene groups; and r is a mean addition number of moles of $B^1O$ and 1 to 12).

The present invention relates to the cement additive comprising one or more kinds of the shrinkage reducing agents containing a (poly)alkylene compound having an unsaturated bond represented by the formula (1), one or more kinds of the shrinkage reducing agents (B) represented by the formula (3) and a cement dispersant.

The present invention relates to the cement additive, wherein the cement dispersant is one or more kinds of dispersants selected from the group consisting of lignin-, melamine-, naphthalene-, oxycarboxylic acid- and polycarboxylic acid-based dispersants.

The present invention relates to the cement additive, wherein the cement dispersant is based on polycarboxylic acid.

The present invention relates to the cement additive, wherein the polycarboxylic acid-based cement dispersant is an ester-based polycarboxylic acid copolymer (PC1) comprising, as constituting units, a monomer 1 represented by the formula (4) and a copolymerizable unsaturated carboxylic acid monomer (UC1), and/or an ether-based polycarboxylic acid copolymer (PC2) comprising, as constituting units, a monomer 2 represented by the formula (5) and a copolymerizable unsaturated carboxylic acid monomer (UC2):

$$R^5-(A^3O)_s-R^6 \quad (4)$$

(wherein $R^5$ is a residue of unsaturated monocarboxylic acid or unsaturated dicarboxylic acid, represented by the formula (4a))

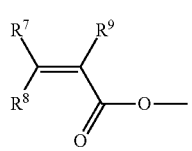

(4a)

(wherein, $R^6$, $R^7$ and $R^9$ are each independently hydrogen or a methyl group; $R^8$ is hydrogen, a methyl group or COOM; M is a hydrogen, alkaline metal, alkaline earth metal or $(A^4O)_f-R^{10}$; $A^3O$ and $A^4O$ are one or more kinds of $C_{2-4}$ oxyalkylene groups; $R^{10}$ is hydrogen or a methyl group, and s and l are mean addition numbers of moles of $A^3O$ and $A^4O$, respectively, and 1 to 100);

$$R^{11}-(A^5O)_t-R^{12} \quad (5)$$

(wherein $R^{11}$ is a residue of unsaturated alcohol represented by the formula (5a));

(5a)

(wherein, $R^{12}$, $R^{13}$, $R^{14}$ and $R^{15}$ are each independently hydrogen or a methyl group; $A^5O$ is one or more kinds of $C_{2-4}$ oxyalkylene groups; u is an integer of 0 to 2; and t is a mean addition number of moles of $(A^5O)$ and 1 to 100).

The present invention relates to the use of the (poly)alkylene compound having an unsaturated bond represented by the formula (1) as a shrinkage reducing agent:

$$R^2O-R^1-O-(A^1O)_n-R^3 \quad (1)$$

$$-(A^2O)_m-R^4 \quad (2)$$

(wherein $R^1$ is a $C_{2-10}$ hydrocarbon group having an unsaturated bond; $R^2$ is hydrogen or the formula (2); $R^3$ and $R^4$ are each independently hydrogen or a $C_{1-8}$ alkyl group; $A^1O$ and $A^2O$ are one or more kinds of $C_{2-4}$ oxyalkylene groups; and n and m are mean addition numbers of moles of $A^1O$ and $A^2O$, respectively, and 1 to 20).

The present invention relates to the use of a (poly)alkylene compound having an unsaturated bond represented by the formula (1) as a shrinkage reducing agent, wherein the unsaturated bond of $R^1$ is a triple bond.

The present invention relates to the use of a (poly)alkylene compound having an unsaturated bond represented by the formula (1) as a shrinkage reducing agent, wherein $R^1$ is a butyne group.

The present invention relates to the use of the shrinkage reducing agent in cement compositions.

The present shrinkage reducing agent renders to cement compositions excellent shrinkage reducing effect and frost-thaw resistance without entraining excessive air, exhibiting excellent solution stability.

The present invention is more closely explained in the following section.

The shrinkage reducing agent comprising a (poly)alkylene compound having an unsaturated bond represented by the formula (1):

$$R^2O-R^1-O-(A^1O)_n-R^3 \quad (1)$$

$$-(A^2O)_m-R^4 \quad (2)$$

In the formula (1), $R^1$ is a $C_{2-10}$ hydrocarbon group having an unsaturated bond, preferably a $C_{4-8}$ hydrocarbon group having a triple bond, and more preferably a butyne group; $R^2$ is hydrogen or the formula (2): $R^3$ and $R^4$ are each independently hydrogen or a $C_{1-8}$ alkyl group; $A^1O$ and $A^2O$ are one or more kinds of $C_{2-4}$ oxyalkylene groups; and n and m are mean addition numbers of moles of $A^1O$ and $A^2O$, respectively, and 1 to 20. The concrete examples are ethyleneoxides, propyleneoxides, and butyleneoxides. The polymerization form of alkyleneoxides added to $A^1O$ and $A^2O$ is not particularly limited, and may be single polymerization of one kind of alkyleneoxide, random copolymerization, block copolymerization or random/block copolymerization of two or more kinds of alkyleneoxides, and the single polymerization of ethyleneoxide is preferable. In the formulae (1) and (2), n and m are mean addition numbers of moles of $A^1O$ and $A^2O$, respectively, and 1 to 20, preferably 1 to 12 and more preferably 1 to 10.

The diol residues having a double bond in the formula (1) include ethene-1,2-diol residue, 2-butene-1,4-diol residue, 2-butene-2,3-diol residue, 3-hexene-1,6-diol residue, 3-hexene-2,5-diol residue, 3-hexene-3,4-diol residue, 2,3-dimethyl-2-butene-1,4-diol residue, 4-octene-1,8-diol residue, 4-octene-2,7-diol residue, 4-octene-3,6-diol residue, 4-octene-4,5-diol residue, 3,4-dimethyl-3-hexene-1,6-diol residue, 3,4-dimethyl-3-hexene-2,5-diol residue, 2,5-dimethyl-3-hexene-1,6-diol residue, 2,5-dimethyl-3-hexene-2,5-diol residue, 2,5-dimethyl-3-hexene-3,4-diol residue, and 5-decene-1,10-diol residue, preferably, ethene-1,2-diol residue, 2-butene-1,4-diol residue, 2-buten-2,3-diol residue, 3-hexene-1,6-diol residue, 3-hexene-2,5-diol residue, 3-hexene-3,4-diol residue and 2,3-dimethyl-2-butene-1,4-diol residue.

The diol residues having a triple bond in the formula (1) include 2-butyne-1,4-diol residue, 4-octyne-1,8-dial residue, 4-octyne-2,7-diol residue, 4-octyne-3,6-diol residue, 2,5-dimethyl-3-hexyne-1,6-diol residue and 2,5-dimethyl-3-hexyne-2,5-diol residue, preferably 2-butyne-1,4-diol residue.

The shrinkage reducing agent comprising a (poly)alkylene compound having an unsaturated bond represented by the formula (1), containing one or more kinds of the shrinkage reducing agents (B) represented by the formula (3):

$$Q^1\text{-O}-(B^1O)_r\text{-}Q^2 \quad (3)$$

In the formula (3), $Q^1$ is a $C_{1-9}$ alkyl group or alkenyl group; $Q^2$ is hydrogen or a $C_{1-8}$ alkyl group; $B^1O$ is one or more kinds of $C_{2-4}$ oxyalkylene groups; and r is a mean addition number of moles of $B^1O$ and 1 to 12).

The cement additive wherein the ester-based polycarboxylic acid comprises, as constituting units, a monomer 1 represented by the formula (4) and a copolymerizable unsaturated carboxylic acid monomer (UC1):

$$R^5\text{-}(A^3O)_s\text{-}R^6 \quad (4)$$

In the formula (4), $R^5$ is a residue of unsaturated monocarboxylic acid or unsaturated dicarboxylic acid, represented by the formula (4a)

(4a)

In the formulae 4 and (4a), $R^6$, $R^7$ and $R^9$ are each independently hydrogen or a methyl group; $R^8$ is hydrogen, a methyl group or COOM; M is a hydrogen, alkaline metal, alkaline earth metal or $(A^4O)_l\text{-}R^{10}$; $A^3O$ and $A^4O$ are one or more kinds of $C_{2-4}$ oxyalkylene groups; $R^{10}$ is hydrogen or a methyl group, and s and l are mean addition numbers of moles of $A^3O$ and $A^4O$, respectively, and 1 to 100.

In the formula (4a), the unsaturated monocarboxylic acid residues or the unsaturated dicarboxylic acid residues include unsaturated monocarboxylic acid residues such as acrylic acid residue, methacrylic acid residue and crotonic acid residue; and unsaturated dicarboxylic acid residues such as maleic acid residue, itaconic acid residue, citraconic acid residue and fumaric acid residue. Acrylic acid residue, methacrylic acid residue and maleic acid residue are preferable.

The compounds having an unsaturated monocarboxylic acid residue concretely include (poly)oxyethylene(meth)acrylate, (poly)oxyethylene crotonate, (poly)oxypropylene (meth)acrylate, (poly)oxypropylene crotonate, (poly)oxyethylene(poly)oxypropylene(meth)acrylate, (poly)oxyethylene(poly)oxypropylene crotonate, (poly)oxyethylene(poly)oxybutylene(meth)acrylate, (poly)oxyethylene(poly)oxybutylene crotonate, methoxy(poly)oxyethylene(meth)acrylate, methoxy(poly)oxyethylene crotonate, methoxy(poly)oxypropylene(meth)acrylate, methoxy(poly)oxypropylene crotonate, methoxy(poly)oxyethylene(poly)oxypropylene(meth)acrylate, methoxy(poly)oxyethylene(poly)oxypropylene crotonate, methoxy(poly)oxyethylene(poly)oxybutylene(meth)acrylate and methoxy(poly)oxyethylene(poly)oxybutylene crotonate, preferably, (poly)oxyethylene(meth)acrylate, (poly)oxypropylene(meth)acrylate, (poly)oxyethylene(poly)oxypropylene(meth)acrylate, methoxy(poly)oxyethylene(meth)acrylate, methoxy(poly)oxypropylene(meth)acrylate, methoxy(poly)oxyethylene(poly)oxypropylene(meth)acrylate, and more preferably, (poly)oxyethylene(meth)acrylate and methoxy(poly)oxyethylene(meth)acrylate.

The compounds having an unsaturated dicarboxylic acid residue concretely include (poly)oxyethylene maleate, (poly)oxyethylene itaconate, (poly)oxyethylene citraconate, (poly)oxyethylene fumarate, (poly)oxypropylene maleate, (poly)oxypropylene itaconate, (poly)oxypropylene citraconate, (poly)oxypropylene fumarate, (poly)oxyethylene(poly)oxypropylene maleate, (poly)oxyethylene(poly)oxypropylene itaconate, (poly)oxyethylene(poly)oxypropylene citraconate, (poly)oxyethylene(poly)oxypropylene fumarate, (poly)oxyethylene(poly)oxybutylene maleate, (poly)oxyethylene(poly)oxybutylene itaconate, (poly)oxyethylene(poly)oxybutylene citraconate, (poly)oxyethylene(poly)oxybutylene fumarate, methoxy(poly)oxyethylene maleate, methoxy(poly)oxyethylene itaconate, methoxy(poly)oxyethylene citraconate, methoxy(poly)oxyethylene fumarate, methoxy(poly)oxypropylene maleate, methoxy(poly)oxypropylene itaconate, methoxy(poly)oxypropylene citraconate, methoxy(poly)oxypropylene fumarate, methoxy(poly)oxyethylene(poly)oxypropylene maleate, methoxy(poly)oxyethylene(poly)oxypropylene itaconate, methoxy(poly)oxyethylene(poly)oxypropylene citraconate, methoxy(poly)oxyethylene(poly)oxypropylene fumarate, methoxy(poly)oxyethylene(poly)oxybutylene maleate, methoxy(poly)oxyethylene(poly)oxybutylene itaconate, methoxy(poly)oxyethylene(poly)oxybutylene citraconate, methoxy(poly)oxyethylene(poly)oxybutylene fumarate, di(poly)oxyethylene mateate, di(poly)oxyethylene itaconate, di(poly)oxyethylene citraconate, di(poly)oxyethylene fumarate, di(poly)oxypropylene maleate, di(poly)oxypropylene itaconate, di(poly)oxypropylene citraconate, di(poly)oxypropylene fumarate, di(poly)oxyethylene(poly)oxypropylene maleate, di(poly)oxyethylene(poly)oxypropylene itaconate, di(poly)oxyethylene(poly)oxypropylene citraconate, di(poly)oxyethylene(poly)oxypropylene fumarate, di(poly)oxyethylene(poly)oxybutylene maleate, di(poly)oxyethylene(poly)oxybutylene itaconate, di(poly)oxyethylene(poly)oxybutylene citraconate, di(poly)oxyethylene(poly)oxybutylene fumarate, dimethoxy(poly)oxyethylene maleate, dimethoxy(poly)oxyethylene itaconate, dimethoxy (poly)oxyethylene citraconate, dimethoxy(poly)oxyethylene fumarate, dimethoxy(poly)oxypropylene maleate, dimethoxy(poly)oxypropylene itaconate, dimethoxy(poly)oxypropylene citraconate, dimethoxy(poly)oxypropylene fumarate, dimethoxy(poly)oxyethylene(poly)oxypropylene maleate, dimethoxy(poly)oxyethylene(poly)oxypropylene itaconate, dimethoxy(poly)oxyethylene(poly)oxypropylene citraconate, dimethoxy(poly)oxyethylene(poly)oxypropylene fumarate, dimethoxy(poly)oxyethylene(poly)oxybutylene maleate, dimethoxy(poly)oxyethylene(poly)oxybutylene itaconate, dimethoxy(poly)oxyethylene(poly)oxybutylene citraconate and dimethoxy(poly)oxyethylene(poly)oxybutylene fumarate, preferably, (poly)oxyethylene maleate, (poly)oxypropylene maleate, (poly)oxyethylene(poly)oxypropylene maleate, methoxy(poly)oxyethylene maleate, methoxy(poly)oxypropylene maleate and methoxy (poly)oxyethylene(poly)oxypropylene maleate, and more preferably, (poly)oxyethylene maleate and methoxy(poly)oxyethylene maleate.

In the formulae (4) and (4a), $A^3O$ and $A^4O$ are one or more kinds of $C_{2-4}$ oxyalkylene groups, and the polymerization form of alkylene oxide to be added is not particularly limited, and may be the single polymerization of one kind of alkylene oxide, or the random copolymerization, block copolymerization or random/block copolymerization of two or more kinds of alkylene oxides. s and l are mean addition numbers of moles of $A^3O$ and $A^4O$, respectively, and 1 to 100, preferably 5 to 50.

The cement additive, wherein the ether-based polycarboxylic acid comprises, as constituting units, a monomer 2 represented by the formula (5) and a copolymerizable unsaturated carboxylic acid monomer (UC2):

$$R^{11}\text{-}(A^5O)_t\text{—}R^{12} \quad (5)$$

(wherein $R^{11}$ is a residue of unsaturated alcohol represented by the formula (5a));

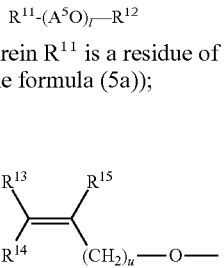

(5a)

In the formulae (5) and (5a), $R^{12}$, $R^{13}$, $R^{14}$ and $R^{15}$ are each independently hydrogen or a methyl group; $A^5O$ is one or more kinds of $C_{2-4}$ oxyalkylene groups; u is an integer of 0 to 2; and t is a mean addition number of moles of ($A^5O$) and 1 to 100.

In the formula (5a), the unsaturated alcohol residues include vinyl alcohol residue, allyl alcohol residue, methallyl alcohol residue, butenyl alcohol residue, methylbutenyl alcohol residue, pentenyl alcohol residue and dimethylpropenyl alcohol residue, preferably, vinyl alcohol residue, allyl alcohol residue, methallyl alcohol residue and methylbutenyl alcohol residue. The compounds having these residues concretely include (poly)oxyethylenevinyl ether, (poly)oxyethylene(meth)allyl ether, (poly)oxyethylenebutenyl ether, (poly)oxyethylenemethylbutenyl ether, (poly)oxyethylenepentenyl ether, (poly)oxyethylenedimethylpropenyl ether, (poly)oxyethylenemethylpentenyl ether, (poly)oxyethylenedimethylpentenyl ether, (poly)oxypropylenevinyl ether, (poly)oxypropylene(meth)allyl ether, (poly)oxypropylenebutenyl ether, (poly)oxypropylenemethylbutenyl ether, (poly)oxypropylenepentenyl ether, (poly)oxypropylenedimethylpropenyl ether, (poly)oxypropylenemethylpentenyl ether, (poly)oxypropylenedimethylpentenyl ether, (poly)oxyethylene(poly)oxypropylenevinyl ether, (poly)oxyethylene(poly)oxypropylene(meth)allyl ether, (poly)oxyethylene(poly)oxypropylenebutenyl ether, (poly)oxyethylene(poly)oxypropylenemethylbutenyl ether, (poly)oxyethylene(poly)oxypropylenepentenyl ether, (poly)oxyethylene(poly)oxypropylenedimethylpropenyl ether, (poly)oxyethylene(poly)oxypropylenemethylpentenyl ether, (poly)oxyethylene(poly)oxypropylenedimethylpentenyl ether, (poly)oxyethylene(poly)oxybutylenevinyl ether, (poly)oxyethylene(poly)oxybutylene(meth)allyl ether, (poly)oxyethylene(poly)oxybutylenebutenyl ether, (poly)oxyethylene(poly)oxybutylenemethylbutenyl ether, (poly)oxyethylene(poly)oxybutylenepentenyl ether, (poly)oxyethylene(poly)oxybutylenedimethylpropenyl ether, (poly)oxyethylene(poly)oxybutylenemethylpentenyl ether, (poly)oxyethylene(poly)oxybutylenedimethylpentenyl ether, methoxy(poly)oxyethylenevinyl ether, methoxy(poly)oxyethylene(meth)allyl ether, methoxy(poly)oxyethylenebutenyl ether, methoxy(poly)oxyethylenemethylbutenyl ether, methoxy(poly)oxyethylenepentenyl ether, methoxy(poly)oxyethylenemethylpropenyl ether, methoxy(poly)oxyethylenemethylpentenyl ether, methoxy(poly)oxyethylenedimethylpentenyl ether, methoxy(poly)oxypropylenevinyl ether, methoxy(poly)oxypropylene(meth)allyl ether, methoxy (poly)oxypropylenebutenyl ether, methoxy(poly)oxypropylenemethylbutenyl ether, methoxy(poly)oxypropyleneteny) ether, methoxy(poly)oxypropylenemethylpropenyl ether, methoxy(poly)oxypropylenemethylpentenyl ether, methoxy(poly)oxypropylenedimethylpentenyl ether, methoxy(poly)oxyethylene(poly)oxypropylenevinyl ether, methoxy(poly)oxyethylene(poly)oxypropylene(meth)ally ether, methoxy(poly)oxyethylene(poly)oxypropylenebutenyl ether, methoxy(poly)oxyethylene(poly)oxypropylenemethylbutenyl ether, methoxy(poly)oxyethylene(poly)oxypropylenepentenyl ether, methoxy(poly)oxyethylene(poly)oxypropylenemethylpropenyl ether, methoxy(poly)oxyethylene(poly)oxypropylenemethylpentenyl ether, methoxy(poly)oxyethylene(poly)oxypropylenedimethylpentenyl ether, methoxy(poly)oxyethylene(poly)oxybutylenevinyl ether, methoxy(poly)oxyethylene(poly)oxybutylene(meth)allyl ether, methoxy(poly)oxyethylene(poly)oxybutylenebutenyl ether, methoxy(poly)oxyethylene(poly)oxybutylenemethylbutenyl ether, methoxy(poly)oxyethylene(poly)oxybutylenepentenyl ether, methoxy(poly)oxyethylene(poly)oxybutylenemethylpropenyl ether and methoxy(poly)oxyethylene(poly)oxybutylenedimethylpentenyl ether, preferably, (poly)oxyethylenevinyl ether, (poly)oxyethylene(meth)allyl ether, (poly)oxyethylenemethylbutenyl ether, (poly)oxypropylene vinyl ether, (poly)oxypropylene(meth)allyl ether, (poly)oxypropylenemethylbutenyl ether, (poly)oxyethylene(poly)oxypropylenevinyl ether, (poly)oxyethylene(poly)oxypropylene(meth)allyl ether, (poly)oxyethylene(poly)oxypropylenemethylbutenyl ether, methoxy(poly)oxyethylenevinyl ether, methoxy(poly)oxyethylene(meth)allyl ether, methoxy(poly)oxyethylenemethylbutenyl ether, methoxy(poly)oxypropylenevinyl ether, methoxy(poly)oxypropylene(meth)allyl ether, methoxy(poly)oxypropylenemethylbutenyl ether, methoxy(poly)oxyethylene(poly)oxypropylenevinyl ether, methoxy(poly)oxyethylene(poly)oxypropylene(meth)ally ether and methoxy(poly)oxyethylene(poly)oxypropylenemethylbutenyl ether, and more preferably, (poly)oxyethylenevinyl ether, (poly)oxyethylene(meth)allyl ether, (poly)oxyethylenemethylbutenyl ether, methoxy(poly)oxyethylenevinyl ether, methoxy(poly)oxyethylene(meth)allyl ether and methoxy(poly)oxyethylenemethylbutenyl ether.

In the formulae (5) and (5a), $A^5O$ is one or more kinds of $C_{2-4}$ oxyalkylene groups, and the polymerization form of alkylene oxides to be added is not particularly limited, and may be the single polymerization of one kind of alkylene oxide, or the random copolymerization, block copolymerization or random/block copolymerization of two or more kinds of alkylene oxides. t is a mean addition number of moles of $A^5O$ and 1 to 100, preferably 5 to 50.

The monomer 1 represented by the formula (4), the monomer 2 represented by the formula (5), and the copolymerizable unsaturated carboxylic acid monomers (UC1) and (UC2) include unsaturated monocarboxylic acid-based monomers such as acrylic acid, methacrylic acid and crotonic acid, and the metal salt, ammonium salt and amine salt thereof; unsaturated dicarboxylic acid-based monomers such as maleic acid, itaconic acid, citraconic acid and fumaric acid, and the metal salt, ammonium salt and amine salt thereof; maleic anhydride; itaconic anhydride; and citraconic anhydride. Acrylic acid, methacrylic acid and maleic acid are preferable.

In the present invention, the above ester-based polycarboxylic acid copolymer (PC1) and/or the ether-based polycarboxylic acid copolymer (PC2) should have a weight average molecular weight in the range of 5,000 to 100,000, preferably 10,000 to 50,000. As long as the objective of the present invention can be achieved, constituting units derived from other copolymerizable monomers in addition to the unsaturated carboxylic acid monomers (UC1) and (UC2) may be contained. The ester-based polycarboxylic acid copolymer (PC1) may be copolymerized with the monomer 2 represented by the formula (5) and the ether-based polycarboxylic acid copolymer (PC2) may be copolymerized with the monomer 1 represented by the formula (4), but production efficiency is reduced because of complicated production process.

The method of adding the present shrinkage reducing agent is limited in no way, and similarly to the method of adding ordinary cement admixtures, method of mixing the cement additive to cement compositions, method of adding the cement additive to once-kneaded concrete compositions or a method of adding the cement additive during the transportation by a concrete mixer truck or after the arrival at a site can properly be applied, and the optimal method can be selected case by case in consideration of the application conditions.

The present shrinkage reducing agents include, but not particularly limited to, ordinary, moderate heat-, low-heat and white Portland cements; eco-cement produced from raw materials such as municipal waste incinerated ash or sewage sludge incinerated ash; mixed cements obtained by adding mineral fine powder such as blast furnace slag, silica fume, lime stone, fly ash, and gypsum to the above cements; and fast-curing cements obtained by adding aluminate minerals. Mixtures of the above cements may also be used. In addition, hydraulic gypsums such as hemihydrate gypsum and anhydrous gypsum are also used.

The present shrinkage reducing agents include all the ones containing water, sand, crushed stone, other aggregates and admixture in addition to inorganic hydraulic substances; for example, in the case where Portland cement is used as an inorganic hydraulic substance, all of cement paste consisting of cement and water, mortar consisting of cement paste and sand, concrete consisting of mortar and coarse aggregate such as crushed stone and the one with which admixture is mixed are included in the present cement additives.

The present shrinkage reducing agents may be used in combination with other materials, if required, as long as the effect is not lost. For example, water-reducing admixture, high performance AE water-reducing admixture, foaming agent, superplasticizing admixture, setting retarder, promoter, thickener and anticorrosives may be used with the present shrinkage reducing agent.

In addition, the present shrinkage reducing agents may be used for various applications so long as the effect is not lost. Said shrinkage reducing agents can be used particularly in cement compositions.

EXAMPLES

The present invention is further explained based on examples in the following section, but the present invention is not limited to the examples. The (poly)alkylene compounds (SR) used in the present examples and the comparative examples are summarized in Table 1, the ether-based polycarboxylic acid copolymers (PC1 and PC2) used in the present examples and comparative examples are summarized in Tables 2 and 3, and the combinations of SR with PC1 and PC2 are summarized in Tables 4 and 8. "UC1" and "UC2" in Tables 2 and 3 are unsaturated carboxylic acid monomers and "polycarboxylic acid polymer" in Tables 4 and 8 is ether-based polycarboxylic acid copolymer.

Example 1

A cement composition was produced by kneading SR-1 (monoethyleneglycol 1,4 butynediol ether) shown in Table 1 at the concentration in solution and in the amount to be added shown in Table 4 under the concrete compounding conditions (compounding A) shown in Table 5.

Example 2

A cement composition was produced in the same manner as the Example 1, except using SR-2 (monopropyleneglycol 1,4 butynediol ether).

Example 3

A cement composition was produced in the same manner as the Example 1, except using SR-3 (polyethyleneglycol 1,4 butynediol ether).

Example 4

A cement composition was produced by kneading SR-1 shown in Table 1, and PC1-1 and PC2-1 shown in Tables 2 and 3 in the ratio, at the concentration in solution and in the amount to be added shown in Table 4 and under the concrete compounding conditions (compounding B) shown in Table 5.

Example 5

A cement composition was produced in the same manner as the Example 4, except using SR-2 as SR.

Example 6

A cement composition was produced in the same manner as the Example 4, except using SR-3 as SR.

Example 7

A cement composition was produced in the same manner as the Example 4, except using SR-1 as SR, and mixing in the ratio, at the concentration in solution and in the amount to be added shown in Table 4.

Comparative Example 1

A cement composition was produced not using SR, PC1 and PC2 under the concrete compounding conditions (compounding A) shown in Table 5.

Comparative Example 2

A cement composition was produced in the same manner as the Example 4, except using SR-4 (diethyleneglycol butylether) as SR.

Comparative Example 3

A cement composition was produced in the same manner as the Example 4, using SR(Surfinol 420 available from AIR PRODUCTS) as SR.

Comparative Example 4

A cement composition was produced in the same manner as the Example 4, using SR-6 (Surfinol 440 available frqm AIR PRODUCTS) as SR.

Comparative Example 5

A cement composition was produced in the same manner as the Example 4, using SR-7 (Surfinol 465 available from AIR PRODUCTS) as SR.

Comparative Example 6

A cement composition was produced in the same manner as the Example 4 not using SR.

TABLE 1

| | Kinds of SR | Remarks |
|---|---|---|
| SR-1 | $HO-CH_2-CH=CH-CH_2-O-(EO)_1-H$ | |
| SR-2 | $HO-CH_2-CH=CH-CH_2-O-(PO)_1-H$ | |
| SR-3 | $HO-CH_2-CH=CH-CH_2-O-(EO)_5-H$ | |
| SR-4 | $CH_3-CH_2-CH_2-CH_2-O-(EO)_2-H$ | |
| SR-5 | $H_3C-CH(CH_3)-CH_2-C(CH_3)(O(EO)_mH)-C\equiv C-C(CH_3)(O(EO)_nH)-CH_2-CH(CH_3)-CH_3$ | m + n = 1.3<br>Surfinol 420 available from AIR PRODUCTS |
| SR-6 | $H_3C-CH(CH_3)-CH_2-C(CH_3)(O(EO)_mH)-C\equiv C-C(CH_3)(O(EO)_nH)-CH_2-CH(CH_3)-CH_3$ | m + n = 3.5<br>Surfinol 440 available from AIR PRODUCTS |
| SR-7 | $H_3C-CH(CH_3)-CH_2-C(CH_3)(O(EO)_mH)-C\equiv C-C(CH_3)(O(EO)_nH)-CH_2-CH(CH_3)-CH_3$ | m + n = 10<br>Surfinol 465 available from AIR PRODUCTS |

TABLE 2

| Kinds of compounds | PC1 | | | | Molar ratio (Monomer 1:UC1) | Weight average molecular weight (PEG conversion by GPC) |
|---|---|---|---|---|---|---|
| | Monomer 1 | | | UC1 | | |
| | $R^5$ | $(A^3O)_s$ | $R^6$ | | | |
| PC1-1 | Methacrylicacid | $(EO)_{25}$ | Methyl | Methacrylicacid | 1:2.7 | 27.000 |

TABLE 3

| Kinds of compounds | PC2 | | | | Molar ratio (Monomer 2:UC2) | Weight average molecular weight (PEG conversion by GPC) |
|---|---|---|---|---|---|---|
| | Monomer 2 | | | UC2 | | |
| | $R^{11}$ | $(A^5O)_t$ | $R^{12}$ | | | |
| PC2-1 | C5 alcohol | $(EO)_{50}$ | Hydrogen | Acrylic acid | 1:1 | 35.000 |

TABLE 4

| | Concrete compounding | SR | | | Polycarboxylic acid polymer | | | | |
|---|---|---|---|---|---|---|---|---|---|
| | | Kinds of SR | Concentration in solution | Amount to be added | Kinds of PC1 | Kinds of PC2 | PC1:PC2 ratio | Concentration in solution | Amount to be added |
| | | | | | | | | PC1 + PC2 | |
| Example 1 | Compounding A | SR-1 | 50% | Cx0.5% | — | — | — | — | — |
| Example 2 | | SR-2 | 50% | Cx0.5% | — | — | — | — | — |
| Example 3 | | SR-3 | 50% | Cx0.5% | — | — | — | — | — |
| Example 4 | Compounding B | SR-1 | 50% | Cx0.5% | PC1-1 | PC2-1 | 90:10 | 15% | Cx1.0% |
| Example 5 | | SR-2 | 50% | Cx0.5% | PC1-1 | PC2-1 | 90:10 | 15% | Cx1.0% |
| Example 6 | | SR-3 | 50% | Cx0.5% | PC1-1 | PC2-1 | 90:10 | 15% | Cx1.0% |
| Example 7 | | SR-1 | 50% | Cx0.5% | PC1-1 | PC2-1 | 75:25 | 15% | Cx1.0% |
| Comparative Example 1 | Compounding A | — | — | — | — | — | — | — | — |
| Comparative Example 2 | Compounding B | SR-4 | 50% | Cx0.5% | PC1-1 | PC2-1 | 90:10 | 15% | Cx1.0% |
| Comparative Example 3 | | SR-5 | 50% | Cx0.5% | PC1-1 | PC2-1 | 90:10 | 15% | Cx1.0% |
| Comparative Example 4 | | SR-6 | 50% | Cx0.5% | PC1-1 | PC2-1 | 90:10 | 15% | Cx1.0% |
| Comparative Example 5 | | SR-7 | 50% | Cx0.5% | PC1-1 | PC2-1 | 90:10 | 15% | Cx1.0% |
| Comparative Example 6 | | — | — | — | PC1-1 | PC2-1 | 90:10 | 15% | Cx1.0% |

The amount of SR to be added and the amount of polycarboxylic acid polymer (Cx %) to be added are weight % based on the mass of the cement contained in concrete.

Experimental Examples

Under the concrete compounding conditions summarized in Table 5, length change test and frost-thaw resistance test were conducted on the combinations as shown in Table 4.

TABLE 5

| Concrete Compounding | | Slump (cm) | Air content (%) | W/C | s/a | Unit amount (kg/m$^3$) | | | |
|---|---|---|---|---|---|---|---|---|---|
| | | | | | | W | C | S | G |
| Compounding A | Plain | 18.0 ± 1.0 | 1.5 ± 0.5 | 57.7 | 49.5 | 202 | 350 | 859 | 898 |
| Compounding B | 18% Water reduction | 18.0 ± 1.0 | 4.5 ± 0.5 | 47.4 | 48.4 | 166 | 350 | 846 | 925 |

Materials used: As cement, ordinary Portland cement available from Taiheiyo Cement (density=3.16 g/cm$^3$), as fine aggregate, land sand from the reservoirs along the Oi River (density in saturated surface-dry condition=2.58 g/cm$^3$, water absorption rate=2.17%, FM=2.70), as coarse aggregate, crushed stone from Oume (density in saturated surface-dry condition=2.65 cm$^3$, solid content=60.7%) were used.

Kneading and mixing: Kneading and mixing were conducted using a pan-type compulsory kneading mixer with a normal capacity of 55 I in the following manner: (G+1/2S+C+1/2S)→10 sec.→(W+PC+SR)→90 sec.→discharge•measurement Length Change Test Length change rates were calculated in accordance with JIS A 1129-3-2001, using the concrete obtained by the above compounding, and shrinkage reducing properties were evaluated.

Frost-thaw Resistance Test

Concrete specimens (10×10×40 cm) were prepared from the concrete obtained by the above compounding. The measurement was conducted in accordance with JIS A1148-2001.

Solution Stability Test

Solution stabilities of the combinations of the compounding B shown in Table 4 were confirmed at temperatures of 5, 20 and 40° C.

The results of the length change test were summarized in Table 6.

TABLE 6

| | Concrete Compounding | Length change rate (μ) | | | |
|---|---|---|---|---|---|
| | | 1 Week | 2 Weeks | 4 Weeks | 8 Weeks |
| Example 1 | Compounding A | −0.030 | −0.037 | −0.057 | −0.070 |
| Example 2 | | −0.030 | −0.038 | −0.057 | −0.069 |
| Example 3 | | −0.029 | −0.038 | −0.058 | −0.070 |
| Example 4 | Compounding B | −0.023 | −0.030 | −0.049 | −0.061 |
| Example 5 | | −0.023 | −0.030 | −0.049 | −0.061 |
| Example 6 | | −0.022 | −0.030 | −0.050 | −0.062 |
| Example 7 | | −0.023 | −0.030 | −0.050 | −0.062 |
| Comparative Example 1 | Compounding A | −0.036 | −0.049 | −0.067 | −0.083 |
| Comparative Example 2 | Compounding B | −0.019 | −0.025 | −0.041 | −0.057 |
| Comparative Example 6 | | −0.029 | −0.042 | −0.059 | −0.073 |

The results of the frost-thaw resistance test were summarized in Table 7.

TABLE 7

| | Concrete Compounding | Relative dynamic modulus (%) | | | | | | | | |
|---|---|---|---|---|---|---|---|---|---|---|
| | | 30 cycles | 60 cycles | 90 cycles | 120 cycles | 150 cycles | 180 cycles | 210 cycles | 240 cycles | 270 cycles | 300 cycles |
| Example 4 | Compounding B | 99 | 98 | 98 | 97 | 96 | 95 | 95 | 94 | 93 | 92 |
| Example 5 | | 98 | 98 | 97 | 96 | 95 | 94 | 93 | 93 | 92 | 91 |
| Example 6 | | 98 | 98 | 97 | 96 | 95 | 93 | 93 | 92 | 91 | 90 |
| Example 7 | | 99 | 99 | 98 | 97 | 97 | 96 | 95 | 95 | 94 | 93 |
| Comparative Example 2 | | 82 | 60 | 54 | 47 | 31 | 22 | unmeasurable | — | — | — |
| Comparative Example 6 | | 99 | 98 | 98 | 97 | 96 | 95 | 95 | 95 | 94 | 94 |

The overall test results were summarized in Table 8.

TABLE 8

| | Concrete Compounding | Kinds of SR | Polycarboxylic acid polymer | | | Evaluation | | | Remarks |
|---|---|---|---|---|---|---|---|---|---|
| | | | Kinds of PC1 | Kinds of PC2 | PC1:PC2 | Dry Shrinkage | Frost-thaw | Solution stability | |
| Example 1 | Compounding A | SR-1 | — | — | — | ⊚ | — | — | |
| Example 2 | | SR-2 | — | — | — | ⊚ | — | — | |
| Example 3 | | SR-3 | — | — | — | ⊚ | — | — | |
| Example 4 | Compounding B | SR-1 | PC1-1 | PC2-1 | 90:10 | ⊚ | ⊚ | ○ | |
| Example 5 | | SR-2 | PC1-1 | PC2-1 | 90:10 | ⊚ | ⊚ | ○ | |
| Example 6 | | SR-3 | PC1-1 | PC2-1 | 90:10 | ⊚ | ⊚ | ○ | |
| Example 7 | | SR-1 | PC1-1 | PC2-1 | 75:25 | ⊚ | ⊚ | ○ | |
| Comparative Example 1 | Compounding A | — | — | — | — | — | — | — | |
| Comparative Example 2 | Compounding B | SR-4 | PC1-1 | PC2-1 | 90:10 | ⊚ | x | ○ | |
| Comparative Example 3 | | SR-5 | PC1-1 | PC2-1 | 90:10 | — | — | x | |
| Comparative Example 4 | | SR-6 | PC1-1 | PC2-1 | 90:10 | — | — | x | |
| Comparative Example 5 | | SR-7 | PC1-1 | PC2-1 | 90:10 | — | — | ○ | Excessive air entraining property |
| Comparative Example 6 | | — | PC1-1 | PC2-1 | 90:10 | — | ⊚ | — | |

Since Comparative Examples 3 and 4 exhibited the separation of solution and Comparative Example 5 exhibited excessive air entraining properties in the mortar test, those examples were not evaluated in the concrete test.

Dry Shrinkage Evaluation

Regarding the compounding A compared with Comparative Example 1, and the compounding B compared with Comparative Example 6, the length change rate of not more than 85% was ⊚, 86~94% was ○, and not less than 95% was a Δ.

Frost-thaw Evaluation

Under 300 cycles, relative dynamic modulus not less than 80% was ⊚, 60~79% was ○, 30~59% was Δ, and broken on the way ~29% was x.

Solution Stability Evaluation

No separation observed at temperatures of 5, 20 and 40° C. was ○, and separation observed at any one of the temperatures of 5, 20 and 40° C. was x.

As shown in Table 6, it was confirmed that the cement compositions of the present Examples 1 to 3 exhibited excellent length change rate compared with the cement composition of the Comparative Example 1; and the cement compositions of the present Examples 4 to 7 exhibited nearly the same length change rate as that of the Comparative Example 2 and excellent length change rate compared with the Comparative Example 6.

As shown in Table 8, it was confirmed that the cement compositions of the present Examples 1 to 3 exhibited the shrinkage reducing properties at the same level as that of the Comparative Example 2; the cement compositions of the present Examples 4 to 7 exhibited excellent frost-thaw resistance compared with the Comparative Example 2; the cement compositions of the present Examples 4 to 7 exhibited excellent solution stability compared with those of the Comparative Examples 3 and 4; and the cement compositions of the Examples 4 to 7 exhibited solution stability without entraining excessive air, while the cement composition of the Comparative Example 5 exhibited excessive air entraining properties.

The invention claimed is:

1. A shrinkage reducing agent comprising a (poly)alkylene compound having an unsaturated bond represented by the formula (1):

$$R^2O-R^1-O-(A^1O)_n-R^3 \quad (1)$$

wherein $R^1$ is a $C_{2-10}$ hydrocarbon group having an unsaturated bond; $R^2$ is hydrogen; $R^3$ is hydrogen or a $C_{1-8}$ alkyl group; $A^1O$ is one or more kinds of $C_{2-4}$ oxyalkylene groups; and n is the mean addition numbers of moles of $A^1O$, and 1 to 20.

2. The shrinkage reducing agent according to claim 1, wherein the unsaturated bond of $R^1$ is a triple bond.

3. The shrinkage reducing agent according to claim 1, wherein $R^1$ is a butyne group.

4. The shrinkage reducing agent according to claim 1, comprising additional one or more kinds of shrinkage reducing agents represented by the formula (3):

$$Q^1\text{-O}—(B^1O)_r\text{-}Q^2 \quad (3)$$

wherein $Q^1$ is a $C_{1-9}$ alkyl group or a $C_{1-9}$ alkenyl group; $Q^2$ is hydrogen or a $C_{1-8}$ alkyl group; $B^1O$ is one or more kinds of $C_{2-4}$ oxyalkylene groups: and r is a mean addition number of moles of $B^1O$ and 1 to 12.

5. A cement additive comprising one or more kinds of the shrinkage reducing agents according to claim 4 and a cement dispersant.

6. The cement additive according to claim 5, wherein the cement dispersant is one or more kinds of dispersants selected from the group consisting of lignin-based, melamine-based, naphthalene-based, oxycarboxylic acid-based and polycarboxylic acid-based dispersants.

7. The cement additive according to claim 5, wherein the cement dispersant is based on polycarboxylic acid.

8. The cement additive according to claim 6, wherein the polycarboxylic acid-based cement dispersant is an ester-based polycarboxylic acid copolymer comprising, as constituting units, a monomer 1 represented by the formula (4) and a copolymerizable unsaturated carboxylic acid monomer, and/or an ether-based polycarboxylic acid copolymer comprising, as constituting units, a monomer 2 represented by the formula (5) and the same or a different copolymerizable unsaturated carboxylic acid monomer:

$$R^5\text{-}(A^3O)_s\text{—}R^6 \quad (4)$$

wherein $R^5$ is a residue of unsaturated monocarboxylic acid or unsaturated dicarboxylic acid, represented by the formula (4a)

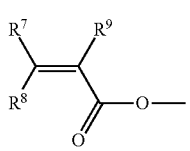

(4a)

wherein, $R^6$, $R^7$ and $R^9$ are each independently hydrogen or a methyl group; $R^8$ is hydrogen, a methyl group or COOM; M is hydrogen, alkaline metal, alkaline earth metal or $(A^4O)_l$—$R^{10}$; $A^3O$ and $A^4O$ are one or more kinds of $C_{2-4}$ oxyalkylene groups; $R^{10}$ is hydrogen or a methyl group, s and 1 are mean addition numbers of moles of $A^3O$ and $A^4O$, respectively, and 1 to 100;

$$R^{11}\text{-}(A^5O)_t\text{—}R^{12} \quad (5)$$

wherein $R^{11}$ is a residue of unsaturated alcohol represented by the formula (5a);

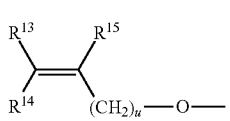

(5a)

wherein, $R^{12}$, $R^{13}$, $R^{14}$ and $R^{15}$ are each independently hydrogen or a methyl group: $A^5O$ is one or more kinds of $C_{2-4}$ oxyalkylene groups; u is an integer of 0 to 2; and t is a mean addition number of moles of $(A^5O)$ and 1 to 100.

9. A method of adding a cement admixture to a cement composition comprising adding to the cement composition a (poly)alkylene compound having an unsaturated bond represented by the formula (1) as a shrinkage reducing agent:

$$R^2O\text{—}R^1\text{—O-}(A^1O)_n\text{—}R^3 \quad (1)$$

wherein $R^1$ is a $C_{2-10}$ hydrocarbon group having an unsaturated bond; $R^2$ is hydrogen; $R^3$ is hydrogen or a $C_{1-8}$ alkyl group; $A^1O$ is one or more kinds of $C_{2-4}$ oxyalkylene groups; and n is the mean addition numbers of moles of $A^1O$, and 1 to 20.

10. The method according to claim 9, wherein the unsaturated bond of $R^1$ is a triple bond.

11. The method according to claim 9, wherein $R^1$ is a butyne group.

12. The cement additive comprising one or more kinds of the shrinkage reducing agents according to claim 1 and a cement dispersant.

13. The cement additive according to claim 12, wherein the cement dispersant is one or more kinds of dispersants selected from the group consisting of lignin-based, melamine-based, naphthalene-based, oxycarboxylic acid-based and polycarboxylic acid-based dispersants.

14. The cement additive according to claim 12, wherein the cement dispersant is based on polycarboxylic acid.

15. The cement additive according to claim 13, wherein the polycarboxylic acid-based cement dispersant is an ester-based polycarboxylic acid copolymer comprising, as constituting units, a monomer 1 represented by the formula (4) and a copolymerizable unsaturated carboxylic acid monomer, and/or an ether-based polycarboxylic acid copolymer comprising, as constituting units, a monomer 2 represented by the formula (5) and the same or a different copolymerizable unsaturated carboxylic acid monomer:

$$R^5\text{-}(A^3O)_s\text{—}R^6 \quad (4)$$

wherein $R^5$ is a residue of unsaturated monocarboxylic acid or unsaturated dicarboxylic acid, represented by the formula (4a)

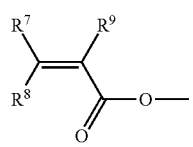

(4a)

wherein, $R^6$, $R^7$ and $R^9$ are each independently hydrogen or a methyl group; $R^8$ is hydrogen, a methyl group or COOM; M is hydrogen, alkaline metal, alkaline earth metal or $(A^4O)_l$—$R^{10}$; $A^3O$ and $A^4O$ are one or more kinds of $C_{2-4}$ oxyalkylene groups: $R^{10}$ is hydrogen or a methyl group, s and 1 are mean addition numbers of moles of $A^3O$ and $A^4O$, respectively, and 1 to 100;

$$R^{11}\text{-}(A^5O)_t\text{—}R^{12} \quad (5)$$

wherein $R^{11}$ is a residue of unsaturated alcohol represented by the formula (5a);

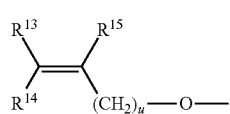

(5a)

wherein, $R^{12}$, $R^{13}$, $R^{14}$ and $R^{15}$ are each independently hydrogen or a methyl group; $A^5O$ is one or more kinds of $C_{2-4}$ oxyalkylene groups; u is an integer of 0 to 2; and t is a mean addition number of moles of $(A^5O)$ and 1 to 100.

* * * * *